United States Patent [19]

Weiss et al.

[11] 4,440,882
[45] Apr. 3, 1984

[54] EMULSION BASED ON EPOXY RESIN AND POLYAMMONIUM SALTS AND ITS PREPARATION

[75] Inventors: Joern-Volker Weiss, Haltern; Heinz Riemer, Bottrop, both of Fed. Rep. of Germany

[73] Assignee: Chemische Werke Huels, AG, Marl, Fed. Rep. of Germany

[21] Appl. No.: 504,929

[22] Filed: Jun. 16, 1983

[30] Foreign Application Priority Data

Jun. 16, 1982 [DE] Fed. Rep. of Germany ....... 3222528

[51] Int. Cl.³ .................. C08L 63/00; C08K 5/16; C08J 3/06; C04B 13/26
[52] U.S. Cl. ...................... 523/401; 106/90; 523/420
[58] Field of Search ............. 523/401, 420; 106/90

[56] References Cited

U.S. PATENT DOCUMENTS

| | | | |
|---|---|---|---|
| 2,772,248 | 11/1956 | Lieberman et al. | 523/414 |
| 3,373,048 | 3/1968 | Angstadt et al. | 106/90 |
| 3,449,278 | 6/1969 | McKay et al. | 106/90 |
| 3,839,252 | 10/1974 | Bosso et al. | 523/420 |
| 3,926,886 | 12/1975 | Kelley et al. | 106/90 |
| 3,936,405 | 2/1976 | Sturni et al. | 523/414 |

FOREIGN PATENT DOCUMENTS

| | | | |
|---|---|---|---|
| 10043463 | 12/1981 | European Pat. Off. | |
| 50-19824 | 3/1975 | Japan | 523/401 |
| 56-141373 | 11/1981 | Japan | 523/401 |
| 1391922 | 4/1975 | United Kingdom | 523/414 |
| 596605 | 3/1978 | U.S.S.R. | 523/428 |

*Primary Examiner*—Ronald W. Griffin
*Attorney, Agent, or Firm*—Millen & White

[57] ABSTRACT

An epoxy resin-polyammonium salt emulsion is based on a liquid epoxy resin, a latent curing agent, an emulsifier, and water, wherein (a) the emulsifier is a primary aliphatic alcohol of 12–14 carbon atoms, an adduct thereof with up to 5 ethylene oxide groups, or a carboxylic acid polyglycol ester, and (b) the latent curing agent is the reaction product obtained by complete neutralization of oxalic acid with a polyamine of the formula

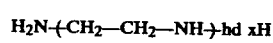

$H_2N\text{-}(CH_2\text{-}CH_2\text{-}NH)_x\text{-}H$ wherein X=2, 3, or 4 or with a reaction product, containing amino groups, of a reaction of this polyamine with fatty acids.

15 Claims, No Drawings

EMULSION BASED ON EPOXY RESIN AND POLYAMMONIUM SALTS AND ITS PREPARATION

CROSS REFERENCE TO RELATED APPLICATIONS

This application is related to commonly assigned, U.S. Ser. Nos. 504,928 and 505,039, filed on June 16, 1983, whose disclosures are incorporated by reference herein.

BACKGROUND OF THE INVENTION

Because of their unique properties, epoxy resins increasingly find a great variety of uses in the building industry (cf., for example, H. Saechtling, "Bauen mit Kunststoffen" [Building with Synthetic Resins], Carl-Hanser Publishers, Munich, 1973). In addition to the pure epoxy resin mortars utilized, for example, for coatings and adhesive bridges, interesting possibilities of application in the building industry are also offered by epoxy resin-cement mortars due to their good adhesive strength, satisfactory shrinkage characterics, and water retention capacity.

An essential prerequisite for the processing of epoxy resins is that the resin and the curing agent must react, under the weathering conditions prevailing at the building site, extensively completely with each other within an adequate period of time.

The binder mixture described in DOS No. 2,840,874, consisting of a hydraulic binder, an epoxy resin, the adduct from a polyamine and an epoxy compound, water, and optionally reactive diluents, pigments, and other auxiliary agents, is particularly suitable for renovating damaged reinforced concrete parts, since the use of a corrosion-protective primer is not necessary with this mixture.

A disadvantage of this bicomponent system is that, due to its limited stability, it must be prepared at the building site and processed within a relatively brief time span (about one-half hour). It is known that the ratio of curing agent to epoxy resin is of decisive importance. Therefore, the cited process wherein a rapid and very careful intermixing is important, lest impairment of quality occur, has received drawbacks under practical conditions.

According to U.S. Pat. No. 3,926,886, it is more advantageous to start with an epoxy resin-diammonium acetate or formate emulsion consisting of a liquid epoxy resin, water, and a substituted diammonium salt, and to effect curing in the presence of cement.

The diammonium salt has a dual function in this process: on the one hand, it is to liberate the basic diamine after reacting with the alkaline-acting cement, the diamine then curing the epoxy resin; on the other hand, it is to function as an emulsifier. However, stability of the thus-produced emulsion is not ensured, especially if the process must be carried out under extreme weather conditions. For this reason, even U.S. Pat. No. 3,926,886 suggests the addition to the mixture of up to 15% of a commercially available emulsifier. Yet, even after making such additions, the stability of the emulsion remains a critical factor.

It is further unsatisfactory that only certain diamines, containing ether groups, of the formula $$R_1-O-R_2-NH-R_3-NH_2$$

are suitable as the amine component. $R_1$ is alkyl of at least 8 carbon atoms and $R_2$ and $R_3$ are lower alkylene of 2-4 carbon atoms.

In contrast, it is desirable to use more readily accessible polyamines and their condensation products for the preparation of emulsions. Polyamines, such as, for example, diethylenetriamine are, however, miscible with water in any desired ratio—in contrast to the diamines of U.S. Pat. No. 3,926,886. The formates and acetates of such polyamines cannot be emulsified with the customary emulsifiers, such as, for example, fatty alcohol oxethylates, alkyl sulfonates, or phosphoric acid half esters. On the other hand, only homogeneous, stable emulsions are capable of ensuring, in uniform quality, cold curing of the liquid epoxy compounds utilized.

SUMMARY OF THE INVENTION

Accordingly, it is an object of this invention to provide a formulation based on polyamines which enables the production of stable aqueous epoxy resin-polyammonium salt emulsions.

Upon further study of the specification and appended claims, further objects and advantages of this invention will become apparent to those skilled in the art.

These objects have been attained by providing emulsions comprising:
1. a liquid epoxy resin;
2. a primary, aliphatic alcohol of 12–14 carbon atoms, an adduct thereof with up to 5 ethylene oxide groups, or a carboxylic acid polyglycol ester;
3. the reaction product obtained by complete neutralization, with oxalic acid, of a polyamine of the formula $$H_2N-(CH_2-CH_2-NH)_x H$$

wherein x is 2, 3, or 4
or of a reaction product containing amino groups which is obtained by reacting this polyamine with fatty acids; and
4. water.

This invention furthermore concerns a process for preparing these emulsions, as well their use.

DETAILED DISCUSSION

It is to be noted, herein, that the term "emulsions", within the scope of this invention refers not only to the two-phase systems resulting from dispersion of a liquid phase in another liquid phase, but also to those systems wherein a solid phase is dispersed in a liquid phase, as well as to all intermediates between these two systems.

Per this invention, the amine component is not to react with epoxy resins to form adducts at an elevated temperature, as described, for example, in EP-A1-00 43 463, wherein the adducts are rendered water-soluble and dispersible by the addition of an acid. Rather, this invention involves the preparation of an emulsion from a polyammonium salt and an epoxy resin wherein the curing process is initiated only after the addition of an alkaline-reacting compound.

The emulsions of this invention can be utilized in epoxy resin mortars, and also in epoxy resin-cement mortars. They are also useful in curing mixtures containing alkaline-reacting compounds and optional mineral fillers. They are furthermore suitable for sealing fresh concrete surfaces to improve the water retention capacity of the concrete. Moreover, their use in these fashions is fully conventional unless indicated otherwise herein and is described in H. Saechtling, "Bauen mit Kunststoffen", Carl-Hanser Publishers, Munich, 1973.

For example, when used in the mentioned mixtures, they are normally contained in amounts of 5–50 wt.%. Regarding their use, also see commonly assigned U.S. patent application Ser. No. 505,039, filed on June 16, 1983, whose disclosure is incorporated by reference herein.

Suitable amino components of the latent curing agent include:

I. polyamines, such as, for example, diethylenetriamine (DETA), triethylenetetramine (TETA), and tetraethylenepentamine (TEPA), or II. the reaction product obtained by reacting the aforementioned polyamines with a less than stoichiometric amount of fatty acids, such that free amino groups are still present in the polyamine. The fatty acids usually contain 16–19 C-atoms. Customarily, dimerized, unsaturated fatty acids, e.g., linoleic acid, are used as the starting compounds. In addition to the reactive amino groups, such products also contain amide groups and in many cases imidazoline units as well (see also H. Lee, C. Neville, "Handbook of Epoxy Resins", McGraw Hill, New York, pp. 10-2 et seq., whose disclosure is incorporated by reference herein). Such products are commercially available. The exact chemical structure of the commercially available products, such as, for example, "VERSAMID" 125 (cf. DOS No. 2,262,791) and "VERSAMID" 140, as well as "EUREDUR" 250 from Schering, Berlin, is unknown. The reaction is conducted fully conventionally. Usually, the amount of fatty acid used is 0.5–2 equivalents based on the number of primary and secondary amino groups in the polyamine. Mixtures of fatty acids can also be used. It is the free amino groups, of course, which are to be completely neutralized in the oxalic acid. Usually, the number of free amino groups remaining is 50–80 mole % based on the original number of amino groups in the polyamine.

The amount of amino component used in the emulsion is dependent on the nature of the epoxy resin and is usually determined in conjunction with data supplied by the epoxy resin manufacturer, e.g., the epoxy value of the epoxy resin or the indicated mixing ratio of resin and curing agent. Optimal amounts can be determined conventionally perhaps with a few routine, preliminary experiments.

The oxalic acid can be replaced by tartaric acid to an extent of up to 15% by weight. If the starting compounds are amino-group-containing reaction products obtained by reacting the polyamines with fatty acids, the oxalic acid can be replaced by tartaric acid or acetic acid to an extent of up to 60% by weight. The neutralization reaction is fully conventional.

Suitable emulsifiers are end-positioned, i.e., primary alcohols of 12–14 carbon atoms, as well as mixtures thereof. Also suitable are the adducts of these alcohols with up to 5 ethylene oxide groups or mixtures of any with these. Such adducts are formed fully conventionally. Lauryl alcohol and lauryl triglycol are preferably employed. In addition, carboxylic acid polyglycol esters, i.e. the esters of aliphatic $C_{10}$- to $C_{22}$-, especially $C_{18}$-carboxylic acids with polyglycols, e.g. based on ethylene oxide, can be advantageously utilized. Suitable polyglycols include those having number average molecular weights of 800–2 200.

Especially suitable is the product "MARLOWET" EF by Chemische Werke Huls AG. Amounts of emulsifier in the range of 10–20% wt. %, based on the amount of epoxy resin employed have proved to be expedient.

Suitable liquid epoxy compounds for cold curing are fully conventional and predominantly are reaction products of epichlorohydrin or glycidol with 2,2-bis(4-hydroxyphenyl)alkanes. The precise chemical structure of the commercially available epoxy resins, such as, for example, the epoxy resin "EUREPOX" XE 756 of Schering, Berlin, or the epoxy resin "RUTAPOX" VE 2913 of Bakelite GmbH, Duisburg, is unknown. Suitable epoxy compounds will be readily apparent to those of skill in the art and are described, e.g., in H. Lee and C. Neville "Handbook of Epoxy Resins", McGraw Hill, N.Y. whose disclosures are incorporated by reference herein.

The emulsions are suitably prepared by first dissolving an appropriate amount of oxalic acid, or a substitute thereof, in water. Usually a stoichiometric amount is used. A slight excess of acid in the range of up to 5 equivalent % based on the number of amino groups is possible. Subsequently, the polyamine or reaction product thereof with fatty acid is added thereto under agitation until the solution shows a neutral reaction. In case of strong reaction heat, it is recommended to cool the reaction mixture.

The amount of water required for the emulsion depends in essence on the type of amino component. This can readily be determined fully conventionally, perhaps with a few routine, preliminary experiments. For the polyamines, the quantity of water usually ranges between 30% and 75%; for the reaction products of these polyamines with fatty acids, the water usually amounts to 200% to 350%, in each case, based on the amount of epoxy resin. The optimum quantity of water can be readily determined by comparative experiments.

The emulsifier is thereafter introduced under agitation at room temperature. Then, likewise at room temperature, the epoxy resin is gradually added into the mixture under rapid stirring. After this step is completed, the mixture is agitated for another 0.5 to 1.0 hour. In this way, emulsions are obtained which are stable at room temperature over weeks and months. If phase separation occurs, the mixtures can be rapidly homogenized again by resuming agitation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

(a) Preparation of Emulsions (The quantitative data for oxalic acid refer in all cases to the dihydrate.)

EXAMPLE 1

An upright flask with magnetic stirrer was charged with 14 parts by weight of water with 4.6 parts by weight of oxalic acid. Under agitation, 2.7 parts by weight of TETA was added to this solution. After cooling the reaction mixture to room temperature, 2 parts by weight of lauryl alcohol and 1 part by weight of lauryl triglycol were added under stirring to the mixture. Subsequently, 20 parts by weight of epoxy resin "RÜTA- POX" VE 2913 was added gradually to the mixture under rapid agitation (about 1,000 rpm). Thereafter the mixture was stirred for another hour at the same agitator speed.

Comparative Example A

Example 1 was repeated, except the TETA was neutralized exclusively with 4.0 parts by weight of acetic acid. The resultant emulsion disintegrated as early as after a few minutes.

EXAMPLE 2

An emulsion was prepared as described in Example 1 from 8 parts by weight of water, 3.9 parts by weight of oxalic acid, 2.3 parts by weight of DETA, 4.0 parts by weight of "MARLOWET" EF, and 20 parts by weight of epoxy resin "RÜTAPOX" VE 2913.

EXAMPLE 3

An emulsion was produced as disclosed in Example 1 from 7 parts by weight of water, 3.5 parts by weight of oxalic acid, 0.7 part by weight of tartaric acid, 2.3 parts by weight of DETA, 3.0 parts by weight of "MARLOWET" EF, and 20 parts by weight of epoxy resin "RÜTAPOX" VE 2913.

EXAMPLE 4

As indicated in Example 1, an emulsion was made up of 12 parts by weight of water, 4.6 parts by weight of oxalic acid, 2.7 parts by weight of TETA, 2 parts by weight of lauryl alcohol, and 20 parts by weight of epoxy resin "RÜTAPOX" VE 2913.

Comparative Example B

The process of Example 4 was repeated, but neutralizing exclusively with 2.9 parts by weight of formic acid. The thus-obtained emulsion disintegrated as early as after a few minutes.

EXAMPLE 5

An emulsion was prepared as set forth in Example 1 from 50 parts by weight of water, 1.8 parts by weight of oxalic acid, 2.5 parts by weight of acetic acid, 10 parts by weight of "VERSAMID" 140, 2.0 parts by weight of lauryl alcohol, and 20 parts by weight of epoxy resin "RÜTAPOX" VE 2913.

Comparative Example C

The procedure of Example 5 was repeated, but neutralizing exclusively with 4.3 parts by weight of acetic acid. The resultant emulsion was disintegrated as early as after one hour.

EXAMPLE 6

An emulsion was produced as disclosed in Example 1 from 50 parts by weight of water, 2.3 parts by weight of oxalic acid, 2.5 parts by weight of tartaric acid, 10 parts by weight of "VERSAMID" 140, 2.0 parts by weight of lauryl alcohol, and 20 parts by weight of epoxy resin "RÜTAPOX" VE 2913.

EXAMPLE 7

An emulsion was prepared according to Example 1 from 65 parts by weight of water, 1.8 parts by weight of oxalic acid, 2.5 parts by weight of acetic acid, 10 parts by weight of "VERSAMID" 140, 2 parts by weight of lauryl alcohol, and 20 parts by weight of epoxy resin "RÜTAPOX" VE 2913.

EXAMPLE 8

An emulsion was produced as described in Example 1 from 55 parts by weight of water, 1.6 parts by weight of oxalic acid, 2.3 parts by weight of acetic acid, 10.2 parts by weight of "EURODUR" 250, 2.0 parts by weight of lauryl alcohol, and 20 parts by weight of epoxy resin "RÜTAPOX" VE 2913.

EXAMPLE 9

An emulsion was made up as indicated in Example 1 of 65 parts by weight of water, 2.5 parts by weight of oxalic acid, 3.1 parts by weight of acetic acid, 17.8 parts by weight of "VERSAMID" 125, 2.0 parts by weight of lauryl alcohol, and 20 parts by weight of epoxy resin "RÜTAPOX" VE 2913.

(b) Preparation of Epoxy Resin Mortars

EXAMPLE 10

A mixture was prepared from 40 parts by weight of sand 0/1 mm with 12 parts by weight of the emulsion disclosed in Example 2, and 2.5 parts by weight of calcium hydroxide was incorporated into the resultant composition. The thus-obtained mortar cured within 24 hours at a temperature of 23° C. into a firm, tack-free mass.

EXAMPLE 11

As described in Example 10, an epoxy resin mortar was prepared from 40 parts by weight of sand 0/1 mm, 20 parts by weight of the emulsion recited in Example 6, and 1.5 parts by weight of calcium hydroxide.

EXAMPLE 12

As described in Example 10, an epoxy resin mortar was produced from 40 parts by weight of sand 0/1 mm, 12 parts by weight of the emulsion disclosed in Example 4, and 2.5 parts by weight of calcium hydroxide.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An epoxy resin-polyammonium salt emulsion comprising
   (a) a liquid epoxy resin;
   (b) water,
   (c) an emulsifier comprising a primary aliphatic alcohol of 12–14 carbon atoms; an adduct thereof with up to 5 ethylene oxide groups; or a polyglycol ester of a $C_{10-22}$-aliphatic carboxylic acid; and
   (d) a latent curing agent comprising the reaction product obtained by complete neutralization with oxalic acid of (i) a polyamine of the formula $$H_2N-CH_2-(CH_2-NH)_x-H$$

wherein x=2, 3, or 4,
   or of (ii) a reaction product, containing amino groups, of such a polyamine with a fatty acid.

2. An epoxy resin-polyammonium salt emulsion of claim 1 wherein the polyamine is diethylenetriamine, triethylenetetramine or tetraethylenepentamine.

3. An epoxy resin-polyammonium salt emulsion of claim 1 wherein the latent curing agent is the reaction product of oxalic acid with a polyamine.

4. An epoxy resin-polyammonium salt emulsion of claim 1 wherein the latent curing agent is the reaction product of oxalic acid with component (ii).

5. An epoxy resin-polyammonium salt emulsion of claim 4 wherein the fatty acid is a $C_{16-19}$-unsaturated fatty acid.

6. An epoxy resin-polyammonium salt emulsion of claim 4 wherein the number of free amino groups in the product of the fatty acid and the polyamine is 50–80 mole % based on the number of original amino groups in the polyamine.

7. An epoxy resin-polyammonium salt emulsion of claim 1 wherein an amount up to 15% by weight of the oxalic acid is replaced by tartaric acid.

8. An epoxy resin-polyammonium salt emulsion of claim 4 wherein an amount up to 60% by weight of the oxalic acid is replaced by tartaric acid or acetic acid.

9. An epoxy resin-polyammonium salt emulsion of claim 1 wherein the emulsifier is lauryl alcohol, lauryl triglycol or a mixture thereof.

10. An epoxy resin-polyammonium salt emulsion of claim 3 wherein the amount of water is 30–75 wt. % based on the weight of epoxy resin.

11. An epoxy resin-polyammonium salt emulsion of claim 4 wherein the amount of water is 200–350 wt. % based on the weight of epoxy resin.

12. A process for preparing an epoxy resin-polyammonium salt emulsion of claim 1, comprising
   (a) forming an aqueous solution of the oxalic acid,
   (b) adding to this solution an amount of polyamine or said amino-group-containing reaction product sufficient for essentially complete neutralization,
   (c) adding the emulsifier, and
   (d) then adding the liquid epoxy resin under agitation.

13. In an epoxy resin-cement mortar, the improvement wherein the epoxy resin is included as an epoxy resin-polyammonium salt emulsion of claim 1.

14. In a method of curing a mixture comprising an alkaline-reacting compound and, optionally, a mineral filler using a curing agent, the improvement wherein the curing agent is an epoxy resin-polyammonium salt emulsion of claim 1.

15. In a method of sealing a concrete surface by applying thereto a sealing agent, the improvement wherein the sealing agent is an epoxy resin-polyammonium salt emulsion of claim 1.

* * * * *